(No Model.)

T. J. SPARKS.
WAGON BRAKE.

No. 302,359. Patented July 22, 1884.

Witnesses,
Geo. H. Strong.
J. H. Towle.

Inventor,
T. J. Sparks
By Dewey & Co.
Attorneys

UNITED STATES PATENT OFFICE.

THOMAS JEFFERSON SPARKS, OF OROVILLE, CALIFORNIA, ASSIGNOR OF ONE-HALF TO ROBERT McDONALD, OF SAME PLACE.

WAGON-BRAKE.

SPECIFICATION forming part of Letters Patent No. 302,359, dated July 22, 1884.

Application filed March 7, 1884. (No model.)

*To all whom it may concern:*

Be it known that I, THOMAS J. SPARKS, of Oroville, county of Butte, and State of California, have invented an Improvement in Wagon-Brakes; and I hereby declare the following to be a full, clear, and exact description thereof.

My invention relates to a new and useful brake for wagons; and it consists in straps applied to the upper semi-circumference of the wheels, one end of the straps being secured to a transverse beam or bar under the wagon-bed, and the other attached to cranks on a rock-shaft at the back of the wagon, by which means they are tightened down on the wheels to brake them, or loosened to relieve them, as I shall hereinafter fully explain.

The object of my invention is to provide a simple and efficient wagon-brake.

Figure 1:
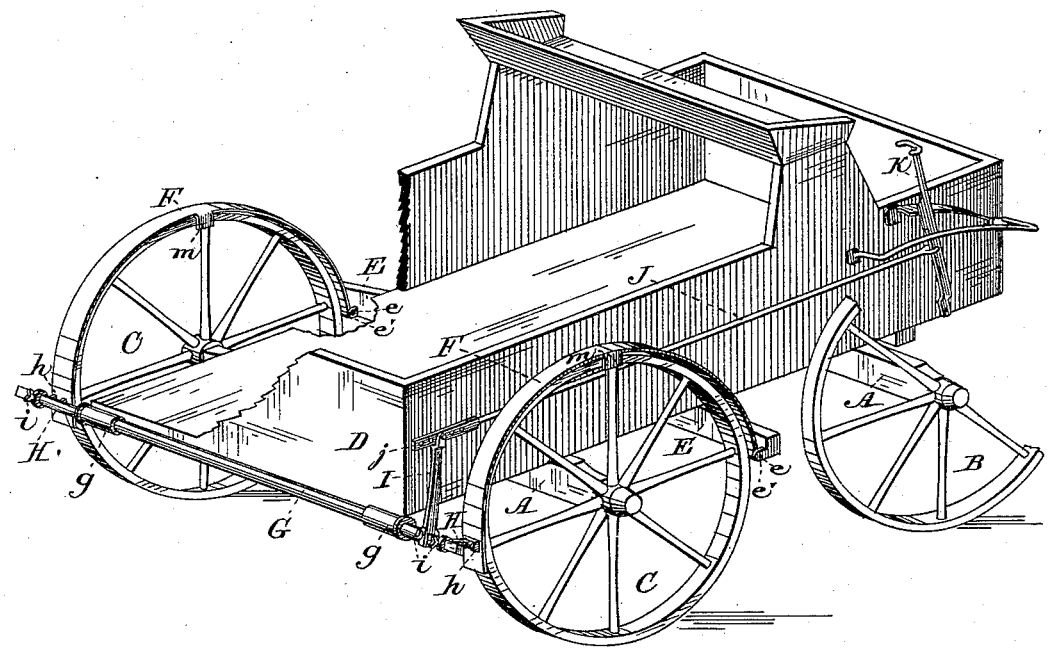
Figure 2:
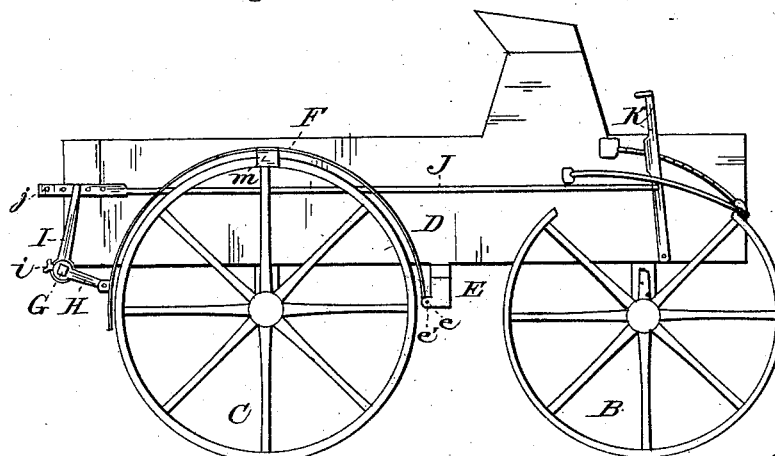
Figure 3:
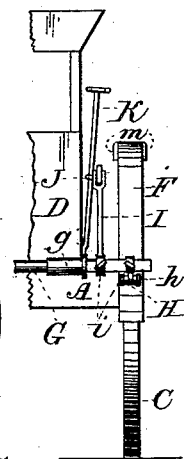

Referring to the accompanying drawings, Figure 1 is a perspective view of a wagon, showing the application of my device. Fig. 2 is a side elevation of a wagon. Fig. 3 is a portion of a rear elevation.

A are the axles, B the forward wheels, C the rear wheels, and D the body or bed, of a wagon. Secured transversely under the body is a bar, E, the ends of which project on each side to about on a line with the outer plane of the rims or tires of the rear wheels. To the ends of this bar are secured the straps F, made, preferably, of sheet metal, and encircling the upper semi-circumference of the wheels. The straps are secured to the bar by being looped or curled about a pin, $e$, mounted in ears $e'$ on said bar.

Mounted in suitable bearings or boxes, $g$, on the back of the wagon-body is a rocking shaft, G, the ends of which are provided with crank-arms H, which are secured to the rear ends of the straps F by being pivoted in small bearings or ears $h$ on said straps. One end of the shaft G is provided with a lever-arm, I, to the top of which is attached the rod J, connecting with the foot or hand lever K in front. The crank-arms H and lever-arm I are secured to their shaft by set-screws $i$, whereby they may easily be removed when necessary. The rear end of the connecting-rod J has a series of holes, $j$, made in it, so that the point of attachment with the lever-arm may be changed to vary the limits of movement of said lever-arm and increase or diminish the friction of the brakes. Upon the top of the straps are guide-flanges $m$, embracing the rim of the wheels and keeping the straps in place. The movement forward of the lever K rocks the shaft forward, throwing its crank-arms downwardly. These pull down on the straps and force them against the tire of the wheel to brake them.

The operation is simple, and is also advantageous in many particulars.

In the common form of brake-blocks, which, by reason of their shortness, have so small a bearing against the wheel, the pressure must be great enough to make the impingement effective, and this pressure, being directed on a small surface, has necessarily a weakening effect on the wheel, and produces an undue strain on the axle, which is directly in the line of pressure; but in the brake here shown the impingement or bearing is over so large a surface that less power is required to operate the device and make it effective, while the same amount of power which is ordinarily exercised will be much more effective than in the other forms of brakes. The pressure, being distributed, produces little strain on the wheel and axle, and may therefore be applied with full force when necessary. Being simple, it is not liable to get out of order, and when it does break it can readily be repaired.

The straps F may be lined with any suitable wearing-surface—such as iron, steel, wood, or rubber.

Having thus described my invention, what I claim as new, and desire to secure by Letters Patent, is—

1. A wagon-brake consisting of the straps F, encircling the upper semi-circumference of the wheels, a bearing consisting of the bar E, having ears $e'$ and a pin, $e$, to which one end of said straps is attached, and the means herein set forth for tightening the straps down on the wheels, substantially as and for the purpose herein set forth.

2. In a wagon-brake, the straps F, encircling the upper semi-circumference of the wheels, a suitable bearing to which one end of the straps is secured, and the means for tightening them down on the wheels, consisting of the rocking shaft G, having crank-arms H pivoted to said straps, and lever-arm I, operating-lever K, and connecting-rod J, substantially as herein described.

3. In a wagon-brake, the straps F and the transverse bar E under the body of the wagon, to the projecting ends of which the forward ends of the straps are attached, in combination with the rocking shaft G at the back of the wagon, the crank-arms H, pivoted to the rear ends of the straps, the lever-arm I, operating-lever K, and connecting-rod J, all arranged and operating substantially as herein described.

4. In a wagon-brake, the straps F, having guide-flanges *m*, embracing the sides of the rims of the wheels, and the bar E under the body, in combination with the rocking shaft G, having crank-arms H, the lever-arm I, operating-lever K, and connecting-rod J, all arranged and operating together substantially as herein described.

5. In a wagon-brake, the straps F and bar E, to which their forward ends are attached, in combination with the rocking shaft G, having crank-arms H, the lever-arm I, operating-lever K, and connecting-rod J, having the holes *j* in its rear end, whereby its point of attachment with the lever-arm may be varied, substantially as and for the purpose herein described.

In witness whereof I have hereunto set my hand.

THOMAS JEFFERSON SPARKS.

Witnesses:
W. Y. BLISS,
L. C. GRANGER.